United States Patent [19]

Taghezout

[11] Patent Number: 5,751,086
[45] Date of Patent: May 12, 1998

[54] MULTIPOLAR MOTOR WITH TWO ROTORS

[75] Inventor: Daho Taghezout, Morges, Switzerland

[73] Assignee: Eta SA Fabriques d'Ebauches, Granges, Switzerland

[21] Appl. No.: 647,787

[22] Filed: May 15, 1996

[30] Foreign Application Priority Data

May 29, 1995 [FR]   France ................................ 95 06309

[51] Int. Cl.$^6$ ........................................ H02K 1/12
[52] U.S. Cl. .................... 310/112; 310/114; 310/162; 310/164; 310/257; 310/266
[58] Field of Search ................ 310/112, 40 MM, 310/257, 156, 254, 162, 266, 164, 114

[56] References Cited

U.S. PATENT DOCUMENTS

| 4,358,693 | 11/1982 | Palmer et al. ...................... 310/46 |
| 4,371,821 | 2/1983 | Laesser et al. ..................... 310/696 |
| 4,455,499 | 6/1984 | Sudler ............................... 310/49 R |
| 4,577,129 | 3/1986 | Bertram ............................. 310/112 |
| 5,051,633 | 9/1991 | Tu et al. ........................... 310/49 R |
| 5,124,599 | 6/1992 | Chan et al. ........................ 310/49 R |
| 5,321,330 | 6/1994 | Taghezout .......................... 310/257 |

FOREIGN PATENT DOCUMENTS

| 0 312 846 B1 | 4/1989 | European Pat. Off. |
| 2 475 247 | 8/1981 | France. |
| 50-77811 | 6/1975 | Japan. |
| 683 810 | 5/1994 | Switzerland. |
| WO 86/00765 | 1/1986 | WIPO. |

*Primary Examiner*—Steven L. Stephan
*Assistant Examiner*—Tran N. Nguyen
*Attorney, Agent, or Firm*—Griffin, Butler Whisenhunt & Kurtossy

[57] ABSTRACT

A multipolar motor with two rotors includes two coaxial axially magnetised rotors (3, 5) arranged on either side of an intermediate stator part (17). First (13) and second (15) stator parts, each having a stator opening (19, 20), are respectively arranged on either side of the rotors. The first and second stator parts each have two polar expansions (13a, 13b, 15a, 15b) defining the stator opening. Each of these polar expansions is connected to the intermediate stator part (17) by a major electric circuit passing through the core (30) of a winding (33a, 33c).

11 Claims, 4 Drawing Sheets ns
MULTIPOLAR MOTOR WITH TWO ROTORS

FIELD OF THE INVENTION

The present invention concerns a multipolar motor with two rotors, in particular for directly driving two hands of a timepiece. A motor of this type may also be used for driving various counter hands or mobile elements.

BACKGROUND OF THE INVENTION

At the present time, an increasingly high number of timepieces which comprise at least one pair of coaxial hands provided to move independently of each other are appearing. These timepieces are, for example, chronographs in which the chronograph hand is mounted in the centre with the hour hand and minute hand. Timepieces which, for example, comprise only two hands indicating the hours and minutes, but wherein these two hands may also move independently of each other in order to provide a second piece of information other than the present time, are also known.

Generally, in timepieces of this type, the driving of the two hands independently of each other, is made possible by the use of two motors. Usually, each of the motors is associated with one of the hands.

Furthermore, it is known that, in order to simplify the construction and to reduce the manufacturer's price of electromechanical timepieces in general, it can be advantageous to use multipolar motors. The advantage of a multipolar motor, as compared to a bipolar motor, is that it enables a hand to be directly driven, without gearing down the movement. In these circumstances, it is possible to mount the hand directly on the rotor shaft of the motor, which removes the necessity of using gears.

Driving two coaxial hands directly with the aid of two multipolar motors is known, in particular, from EP patent No 0 312 946 B1. According to this document, the rotor shaft of a first motor has the shape of a hollow cylinder which forms the pipe of a first hand and the rotor shaft of the second motor is extended by a shaft which passes through the hollow shaft of the first rotor. Thus the rotor shaft of the second motor forms a cannonpinion provided to receive the second hand. The two motors are arranged one above the other.

A construction of this type has disadvantages. Indeed, the height of an assembly of two motors arranged one above the other can be too great for certain applications, such as, for example, extra-flat watches. Further, in order to reduce to a minimum the magnetic influences of one motor over the other, it is necessary to provide a space between these two motors, which further increases the height of this assembly of the prior art.

An aim of the present invention is thus to reduce the bulkiness of motor assemblies provided to actuate independently two coaxial hands, by providing a motor with two rotors for driving two hands independently of each other.

Japanese document JP 50-77811 already discloses a timepiece motor which comprises a plurality of rotors able to be actuated independently of each other. However, according to this document, the timepiece comprises electronic means capable of generating several control signals of different shapes which are each provided for controlling one of the motor rotors.

A device of this type has disadvantages. Indeed, the fact of using electronic means for generating the different control signals complicates the making of the electronic part of the device and makes the operation of the motor less reliable with an unfavourable energy output.

SUMMARY OF THE INVENTION

An object aim of the present invention is thus to provide a motor with two rotors for driving two hands independently of each other, in which it is not necessary to use complex control signals to actuate the two rotors independently of each other, while assuring a high level of operating reliability.

The present invention thus concerns a multipolar motor with two rotors, characterised in that it comprises:

first and second multipolar coaxial rotors each comprising a plurality of magnetic dipoles which are oriented substantially parallel to the axis of rotation of the two rotors and which are arranged in a ring around said axis, said dipoles being also oriented alternatively in a first direction and in the opposite direction, first and second stator parts, an intermediate stator part arranged between said first and second stator parts, each of said stator parts comprising a stator opening, said stator openings being aligned along an identical axis to said rotation axis of said rotors, said first and second stator parts each further comprising first and second polar expansions situated on either side of said respective stator opening, said first and second polar expansions defining respectively first and second serrations formed of a regular succession of teeth and slots on the edges of said stator openings.

Said motor with two rotors is also characterised in that each of said polar expansions is connected to said intermediate stator by a magnetic flux guiding leg on which a winding is mounted, said windings being also electrically connected to means provided for controlling and energizing said motor with two rotors.

Said motor with two rotors is further characterised in that said first rotor is rotatably mounted between said first stator part and said intermediate stator part, said first rotor dipoles being situated, on the one hand, facing said first and second serrations of said first stator part and, on the other hand, facing a polar expansion of the intermediate stator part, and in that said second rotor is rotatably mounted between said second stator part and said intermediate stator part, said second rotor dipoles being situated, on the one hand, facing said first and second serrations of said second stator part and, on the other hand, facing said intermediate stator part polar expansion.

As a result of these characteristics, a motor with two rotors having a reduced size is provided. Furthermore, the presence of the intermediate stator part, which is arranged between the first and the second rotor and which is connected to the four stator polar expansions by four magnetic flux guiding legs, assures the magnetic decoupling of the first and the second stator parts.

Another advantage of the present invention is that the intermediate stator part assures a function of shielding the motor from the external magnetic fields, which increases the reliability of the working of the motor.

BRIEF DESCRIPTION OF THE DRAWINGS

Other characteristics and advantages of the present invention will appear upon reading the following description, which is given solely by way of example and made with reference to the attached drawings in which.

DESCRIPTION OF PREFERRED EMBODIMENTS

Figure 1:
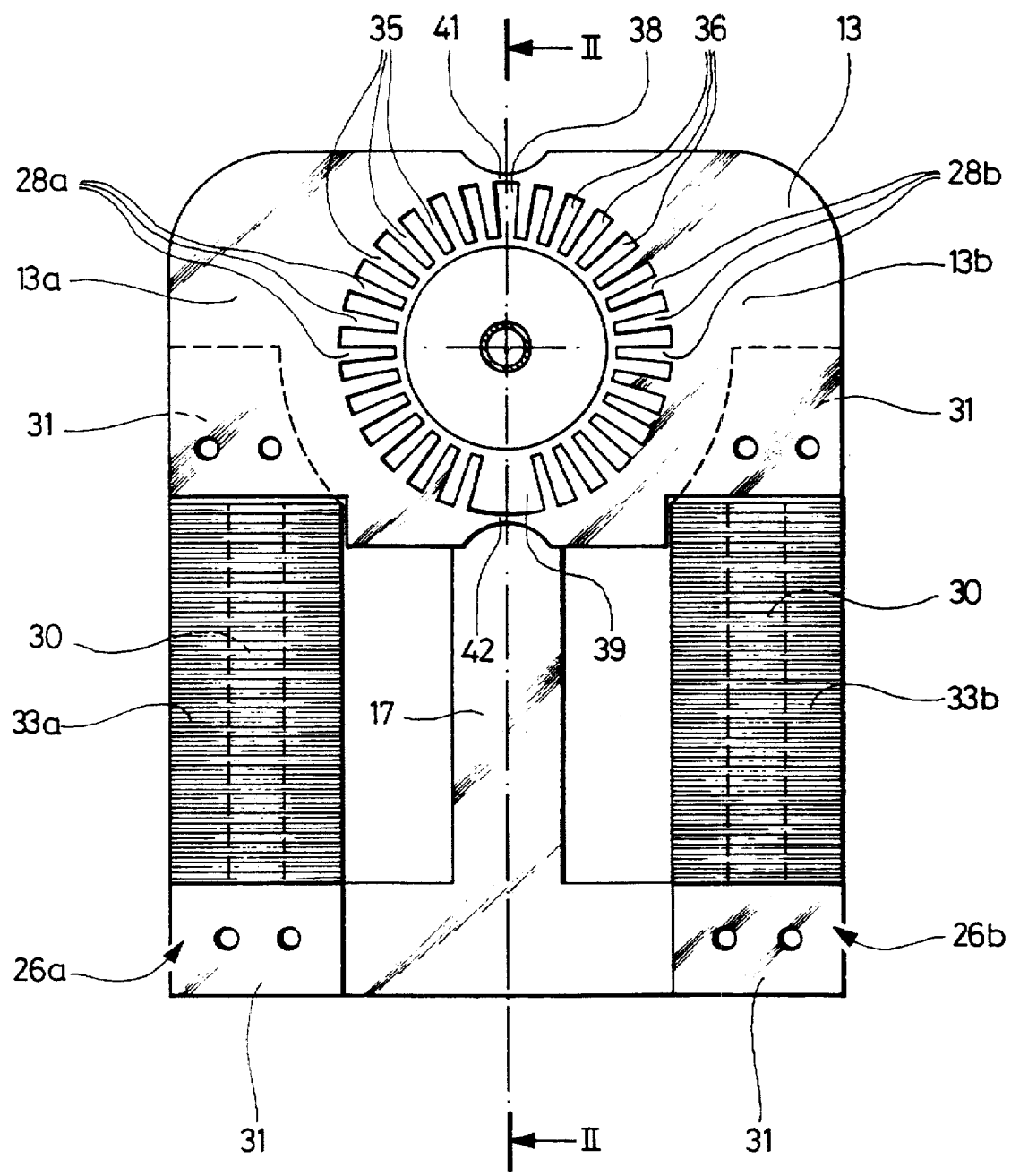
FIG. 1 is a top view of an embodiment of the motor according to the present invention (the rotors having been omitted to facilitate reading of the drawing)
Figure 2:
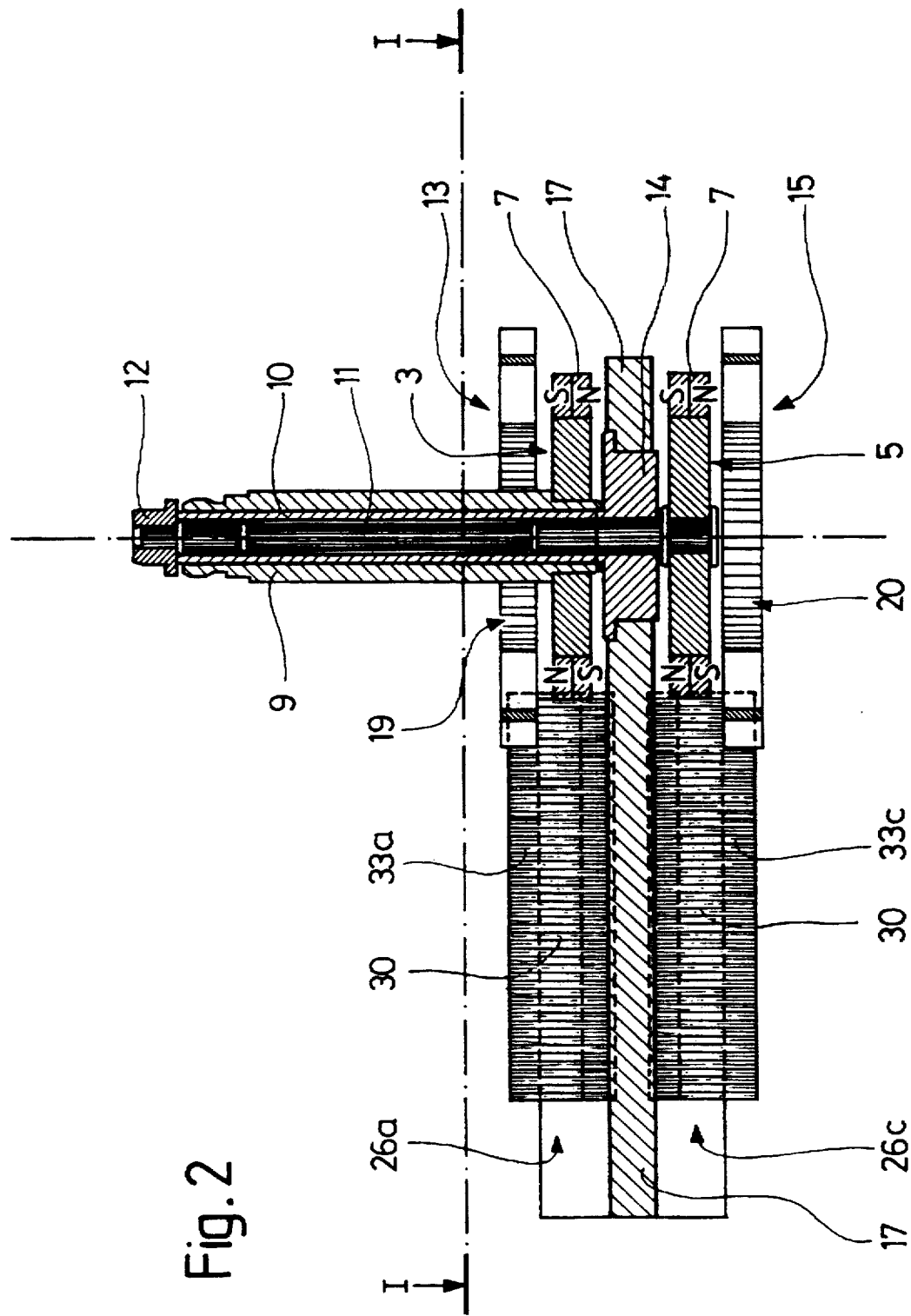
FIG. 2 is a cross-sectional view along the line II—II of FIG. 1 (the rotors being shown)
Figure 3:
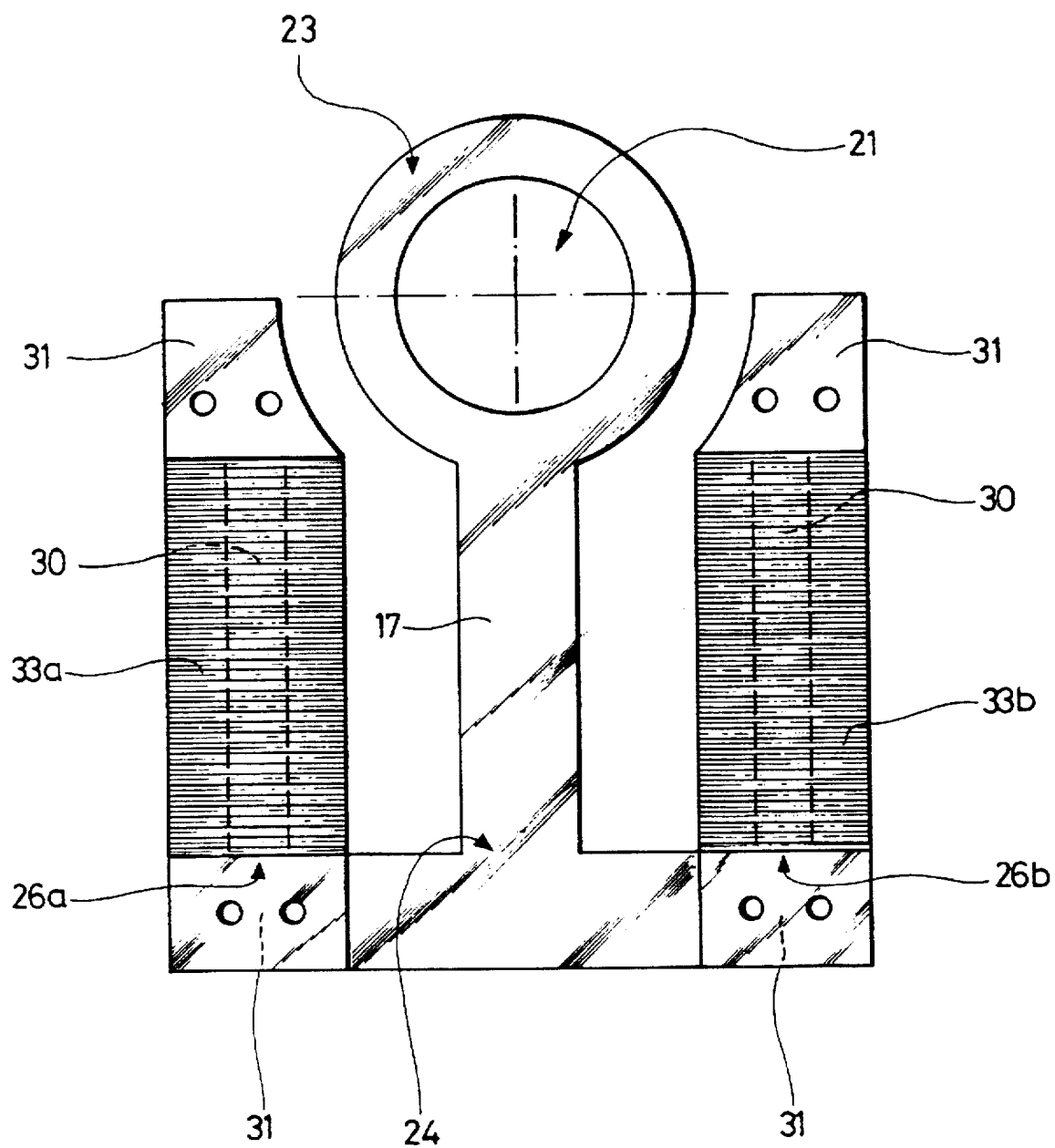
FIG. 3 is a top view of the assembly formed by the intermediate stator, the upper magnetic flux guiding legs and the windings associated therewith, belonging to the motor of FIG. 1.

Referring to FIGS. 1 to 3, an embodiment of a motor according to the present invention will now be described. This motor may be used in particular for driving the hour hand and the minute hand of a clock independently and in both directions. One sees in FIG. 2 that the motor comprises two coaxial rotors which are respectively referenced 3 and 5. These two rotors and the shafts on which they are mounted have been omitted from FIG. 1 to facilitate reading of the drawing.

Rotors 3 and 5 are multipolar rotors with axial magnetisation. They are, in the present example, identical. They each have the general shape of a circular disc and comprise a central part made of a magnetic material surrounded by a peripheral ring formed of a set of magnetic dipoles, comprising permanent magnets referenced 7. In this example, there are 30 magnetic dipoles for each of the rotors. They are oriented axially, i.e., parallel to the rotation axis of the rotor.

Permanent magnets 7 are arranged regularly on the periphery of each rotor and divide the rotor into 30 sectors of 12 degrees each. Furthermore, magnets or magnetic dipoles 7 are oriented alternatively in a first direction and in the opposite direction. Consequently, if one places oneself in the plane of rotation of the rotor, the angular distance separating one magnetic dipole from the next dipole oriented in the same direction is thus two times 12 degrees, that is to say 24 degrees.

Referring to FIG. 2, one sees that multipolar rotors 3 and 5 are respectively mounted on shafts 9 and 11. Shaft 9 which carries rotor 3 is a hollow shaft inside which a centering tube 10 made in a magnetic material such as for example brass passes. Shaft 9 is rotatably mounted about centering tube 10 which is fixed. Centering tube 10 is also hollow, and one sees that shaft 11 which carries rotor 5 passes inside tube 10. In the event that the motor with two rotors of the present example is used for directly driving an hour hand and a minute hand, one of the hands may be directly mounted on shaft or pipe 9, while the other hand will preferably be mounted on a pipe 12 into which the end of shaft 11 is set.

The motor also comprises a first and a second stator part 13 and 15. These two stator parts each comprise a stator opening 19 and 20 of generally circular shape. The motor also comprises an intermediate stator part 17 which comprises a stator opening 21 (FIG. 3) in which a flange 14 is arranged. The three stator parts 13, 15 and 17 are arranged parallel to each other and their stator openings are aligned according to an identical axis to the axis of rotors 3 and 5. Stator opening 21 of intermediate part 17 accommodates an end of centering tube 10 which widens in the shape of flange 14.

As a result of the construction which has just been described, centering tube 10 is fixed to intermediate stator part 17, and shafts 9 and 11 carrying rotors 3 and 5 are longitudinally positioned in relation to tube 10 while being free to rotate. It will also be noted in FIG. 2 that first rotor 3 is arranged in a space between first stator part 13 and intermediate stator part 17 and that, in a symmetrical manner, second rotor 15 is arranged in a space between second stator part 15 and intermediate stator part 17.

First and second stator parts 13 and 15 each comprise two polar expansions situated either side of the stator opening (only polar expansions 13a and 13b of first stator part 13 are visible in FIG. 1). Each of these polar expansions ends in a serration 28a, 28b on the edge of the stator opening. It to be noted that, in the present example, first and second stator parts 13 and 15 are identical.

As can be seen in FIG. 3, intermediate stator part 17 is formed, on the one hand, of an annular part 23 which surrounds stator opening 21 and, on the other hand, a connecting part 24 in the shape of a T. Annular part 23 is arranged between the first and the second stator part, vis-à-vis both the two serrations 28a and 28b of first stator part 13 and the serrations (not visible in FIG. 1) of second stator part 15. Connecting part 24 comprises two fixing lugs 31 which respectively form the left end and the right end of the bar of a T. The left lug is magnetically coupled via magnetic flux guiding leg 26a to polar expansion 13a of stator part 13, and via magnetic flux guiding leg 26c to the corresponding polar expansion of stator part 15. Likewise, the right lug is magnetically coupled via guiding legs 26b and 26d to polar expansion 13b of the first stator and to the corresponding polar expansion of the second stator.

Each of magnetic flux guiding legs 26a, 26b, 26c and 26d is formed of a rectilinear core 30 terminated at both its ends by fixing lugs. The connection between the legs and the stator parts may thus be assured by screws (not shown). However, any other fixing means known to the man skilled in the art may be envisaged. Four windings or coils 33a, 33b, 33c and 33d are mounted around cores 30 of legs 26a, 26b, 26c and 26d. These four windings are also electrically connected to control and energizing means 45.

As has already been mentioned, each of polar expansions 13a, 13b, and 15a, 15b of the first and second stator parts ends in a serration arranged on the edge of the stator opening. As can be seen in FIG. 1, these serrations or indentations are each formed of an alternation of teeth 35 and slots 36 which, in this example, all have the same width. The two serrations 28a and 28b formed on the edge of stator opening 19 are separated from each other by two connecting slots referenced 38 and 39 in FIG. 1. These two connecting slots are arranged facing two ismthus 41 and 42 which form highly reluctant zones used to magnetically insulate the two stator polar expansions 13a and 13b.

Referring again to FIG. 2, one can see that according to the construction described until now, cores 30 of the different windings 33a, 33b, 33c and 33d are each magnetically coupled via their first end to one of the respective stator polar expansions and via their second end to intermediate stator part 17. Thus, a current flowing in one of windings 33a, 33b, 33c or 33d produces a magnetic field which is led, on the one hand, to one of the respective stator polar expansions and, on the other hand, to intermediate stator part 17. The magnetic field lines thus guided close again through a magnetic gap and define a principal magnetic circuit via winding 33a, 33b, 33c and 33d. In order to concentrate the magnetic field generated in the magnetic gap by each of the windings on the permanent magnets of the two rotors 3 and 5, it is advantageous for generally annular-shaped part 23 of the intermediate stator to extend as little as possible outside the area strictly situated vis-à-vis the serrations of first and second stators 13 and 15.

In conformity with what has just been described, the motor with two rotors of the present example comprises four principal magnetic circuits. Each of these magnetic circuits is formed of ferromagnetic parts which channel the induction field produced by one of the windings towards a magnetic gap between the edges of which the magnets of one of the rotors rotates. It is further to be noted that experiments show that the coupling between the different principal magnetic circuits is remarkably weak, to such an extend that it can be completely ignored.

Referring again to FIG. 1, the serrations which each end in polar expansions of first and second stator parts 13 and 15 will now be described in more detail. As has already been mentioned, in this example, each of the serrations is regular. Furthermore, each serration is provided so that the space between the centre of one tooth and the centre of the following tooth is equal to the space separating, on the rotor, a magnetic dipole from the following dipole oriented in the same direction. In these circumstances, it will be understood that if the north pole of a rotor dipole is situated exactly facing a tooth, the other teeth of the same serration will also be exactly facing a north pole of the rotor.

A careful examination of FIG. 1 reveals that the two serrations of the same stator part (serrations 28a and 28b for stator part 13) are angularly staggered. More specifically, if the angular distance separating two teeth of a same serration is always a multiple of 24 degrees in the present embodiment described, the angular distance separating a tooth of a serration from a tooth of the other serration is equal to a multiple of 24 degrees increased or reduced by 6 degrees. In these circumstances, it will be understood that if the teeth of a serration are exactly facing the north poles of a rotor, the teeth of the other serration are each exactly half way between a north pole and a south pole of this rotor.

By way of example, an operating mode of the motor with two rotors according to the first embodiment of the present invention will now be described. According to this operating mode, the step by step movement of each of the rotors in a given direction is independently controlled by alternately energizing the two windings which are associated with this rotor. When winding 33a is supplied with a current flowing in a given direction, the magnetic field thus produced brings half of the dipoles of rotor 3 which are oriented in a given direction into alignment facing the teeth of serration 28a. If, in the next moment, winding 33b is energized, half of the dipoles of rotor 3 which are oriented in a given direction will align on the teeth of serration 28b. It will thus be understood that by alternately energizing windings 33a and 33b and by correctly choosing the direction of flow of the current in the latter, it is possible to control a step by step movement of the rotor in either rotational direction. Because of the staggering of 6 degrees between the two serrations, each step of the rotor corresponds to 6 degrees and the complete revolution corresponds to 60 steps, which is advantageous for directly driving a watch hand.

An advantage of the embodiment which has just been described, is that the motor can operate in both directions without requiring additional means for providing a positioning torque for rotors 3 and 5. Indeed, by maintaining the energizing of the winding which has just caused the rotor to take a step during the pause which follows this step, one produces the desired positioning torque. Such an arrangement is not, however, suitable for situations in which one wishes to limit the electric consumption of the motor.

A second embodiment of the present invention, particularly suited to low consumption applications, such as wrist-watches for example, will now be briefly described. In this alternative embodiment of the invention, the structure of the motor is practically identical to the structure of the motor described above. However, instead of including 30 dipoles as in the preceding example, the multipolar rotors with axial energizing of this example comprise 60.

The second essential difference between the present embodiment and the preceding one is that in addition to its function of channelling the magnetic fields produced by the different windings, intermediate stator part 17 also provides a positioning torque for each of the rotors. Notches (not shown) are made in annular part 23 of the intermediate stator part for this purpose.

The man skilled in the art knows how, in the case of a multipolar motor with a single rotor, to arrange notches on the stator to determine the rest position of the rotor and thus its positioning torque. In the case of the motor with two rotors of the present invention, it is sufficient to arrange the notches required to determine the positioning torque of a single rotor on annular part 23 of intermediate stator part 17. Naturally, in a symmetrical manner, these notches will also determine the positioning torque of the second rotor. However, the determining feature in the positioning torque of a rotor is its value measured relative to the serrations of the stator. In these circumstances, by angularly staggering the serrations on second stator part 15 at an adequate angle in relation to those on first stator part 13, one can obtain any two positioning torques for the two rotors 3, 5.

As a result of these modifications, the motor of the present invention may function without consuming electricity for providing a positioning torque to the rotors. Further, the control of the motor is simplified since only one winding is required to move the motor forward in one direction and the other winding is used for the other direction.

Figure 4:
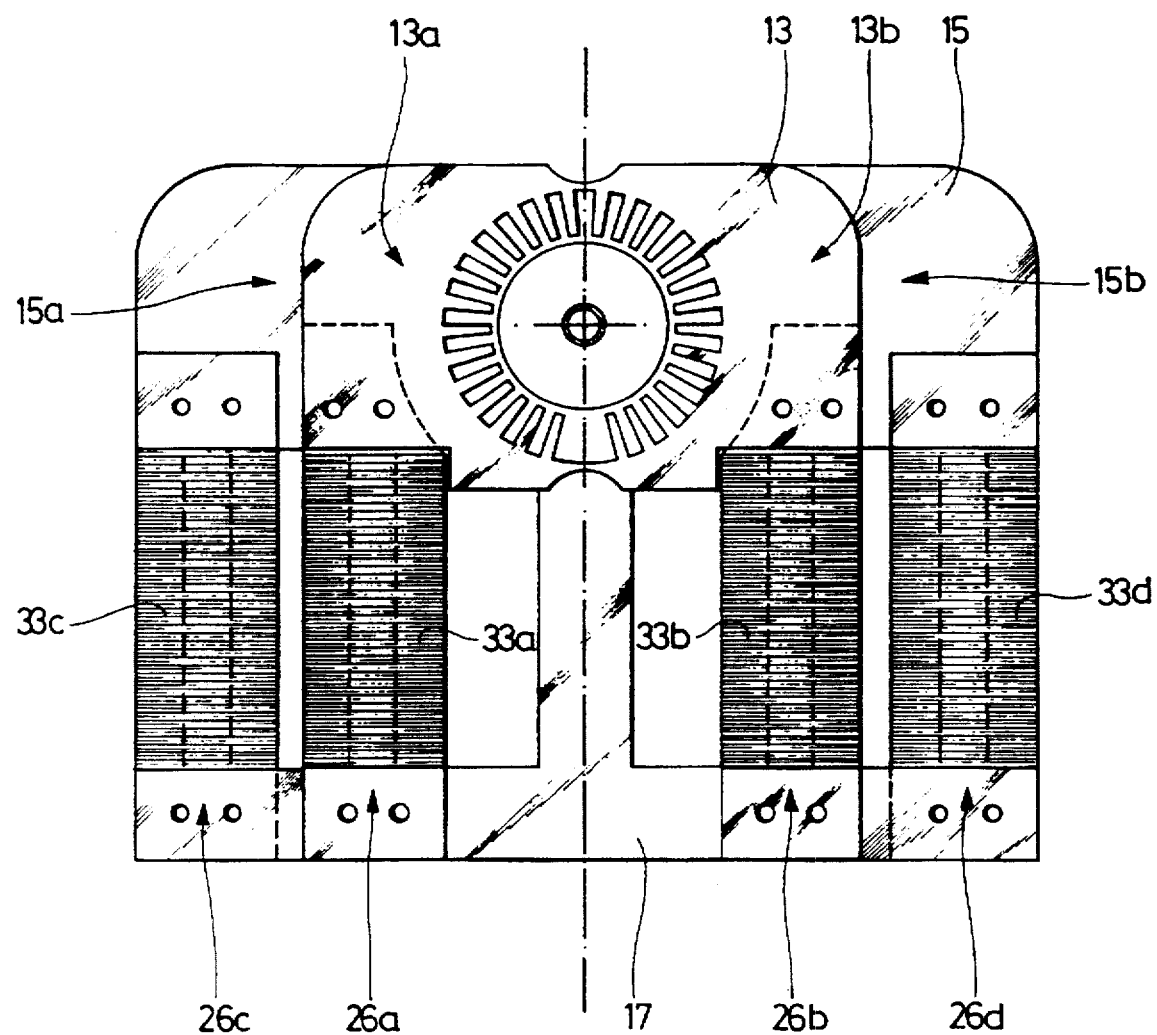
FIG. 4 is a top view of an alternative embodiment of the present invention.

Finally, FIG. 4 shows a schematical cross-sectional view of an alternative embodiment of the first embodiment of the present invention. The operating principle of this motor is identical to one of those which have been described above. However, as can be seen in FIG. 4, windings 33a and 33b, which are associated with polar expansions 13a and 13b and respectively mounted on legs 26a and 26b, are not superposed on windings 33c and 33d, which are associated with polar expansions 15a and 15b and respectively mounted on legs 26c and 26d. This staggered arrangement has the advantage of allowing windings of a greater diameter to be used without increasing the total height of the motor.

What is claimed is:

1. A multipolar motor comprising:
   first and second multipolar coaxial independently rotatable rotors each comprising a plurality of magnetic dipoles which are oriented substantially parallel to the axis of rotation of the two rotors and which are arranged in a ring around said axis, said dipoles being also oriented alternatively in a first direction and in an opposite direction relative to said first direction;
   first and second stator parts;
   an intermediate stator part arranged between said first and second stator parts;
   each of said stator parts comprising a stator opening, the stator openings being aligned along an identical axis to said axis of rotation of said rotors, said first and second stator parts each further comprising first and second polar expansions situated on either side of a respective stator opening, said first and second polar expansions defining respectively first and second serrations formed of a regular succession of teeth and slots on the edges of said respective stator openings each of said polar expansions being connected to said intermediate stator part by a magnetic flux guiding leg on which a winding is mounted, the windings being also electrically connected to means provided for controlling and energizing said motor, said first rotor being rotatably mounted between said first stator part and said intermediate stator part, said dipoles of said first rotor being situated, on one side, facing said first and second serrations of said first stator part and, on the other side, facing a polar expansion of the intermediate stator part, said second rotor being rotatably mounted between said second stator part and said intermediate stator part, said dipoles of the second rotor being situated, on one side, facing said first and second serrations of said second stator part and, on the other side, facing said intermediate stator part polar expansion.

2. A multipolar motor according to claim 1, wherein the centers of two successive slots of a serration of the first stator part are separated by an angular distance equal to that which separates one of said magnetic dipoles from the following magnetic dipole oriented in the same direction on the first rotor, the centers of two successive slots of a serration of the second stator part being separated by an angular distance equal to that which separates one of said magnetic dipoles from the following magnetic dipole oriented in the same direction on the second rotor.

3. A multipolar motor according to claim 1, wherein the relative positioning of said first and second serrations of each of the first and second stator parts is such that when one of said magnetic dipoles is situated exactly facing the center of a slot of said first serration, the centers of the slots of said second serration are situated substantially between two successive dipoles.

4. A multipolar motor according to claim 1, comprising means for determining a positioning torque for each of said rotors, said means comprising at least one recess situated at the periphery of said stator opening of said intermediate stator part.

5. A multipolar motor according to claim 1, wherein the number of magnetic dipoles on at least one of said rotors is thirty.

6. A multipolar motor according to claim 1, wherein said first and second regular serrations of each of the first and second stator parts are joined at both their ends by first and second connecting slots.

7. A multipolar motor according to claim 6, having a highly reluctant isthmus between said first and second polar expansions on a level with each of said first and second connecting slots.

8. A multipolar motor according to claim 1, wherein said intermediate stator part consists of a ring mounted at the end of an elongated body at the other end of which two magnetic contact lugs are provided.

9. A multipolar motor according to claim 1, wherein said first and second stators are equal.

10. A multipolar motor according to claim 1, wherein said legs which are connected to said second stator part and said legs which are connected to said first stator part are arranged so that the windings associated with the first stator part are not superposed on the windings associated with the second stator part in relation to a projection in a general plane of the motor.

11. A multipolar motor comprising:

first and second multipolar coaxial independently rotatable rotors each comprising a plurality of magnetic dipoles which are oriented substantially parallel to the axis of rotation of the two rotors and which are arranged in a ring around said axis, said dipoles being also oriented alternatively in a first direction and in an opposite direction relative to said first direction;

first and second stator parts;

windings for energizing the motor;

an intermediate stator part arranged between said first and second stator parts;

each of said stator parts comprising a stator opening, said stator openings being aligned along an identical axis to said axis of rotation of said rotors, said first and second stator parts each further comprising first and second polar expansions situated on either side of a respective stator opening, said first and second polar expansions defining respectively first and second serrations formed of a regular succession of teeth and slots on the edges of said respective stator openings each of said polar expansions being connected to said intermediate stator part by a magnetic flux guiding leg on which a respective one of the windings is mounted, said first rotor being rotatably mounted between said first stator part and said intermediate stator part, said dipoles of said first rotor being situated, on one side, facing said first and second serrations of said first stator part and, on the other side, facing a polar expansion of the intermediate stator part, said second rotor being rotatably mounted between said second stator part and said intermediate stator part, said dipoles of the second rotor being situated, on one side, facing said first and second serrations of said second stator part and, on the other side, facing said intermediate stator part polar expansion.

* * * * *